United States Patent [19]

Fork et al.

[11] 4,057,714

[45] Nov. 8, 1977

[54] DURABILITY OR SERVICE-LIFE MONITORING DEVICE FOR A TURBOGENERATOR SHAFT

[75] Inventors: Kurt Fork, Rosenbach near Neunkirchen; Dietrich Lambrecht, Mulheim (Ruhr); Hermann Waldmann, Wieher near Uttenreuth; Helmut Hofmann, Erlangen, all of Germany

[73] Assignee: Kraftwerk Union Aktiengesellschaft, Mulheim (Ruhr), Germany

[21] Appl. No.: 727,795

[22] Filed: Sept. 29, 1976

[30] Foreign Application Priority Data

Sept. 30, 1975 Germany ............................ 2543587

[51] Int. Cl.[2] ........................ G01L 3/00; G01M 15/00; G06F 15/20

[52] U.S. Cl. ........................................ 264/494; 73/116; 73/136 R; 264/578

[58] Field of Search ................ 235/151.3, 151.21, 184; 73/116, 117.2, 117.3, 136 R, 136 A–136 D, 137, 138; 290/1 R, 7, 40 R; 307/153; 318/140–143, 490; 324/158 MG; 415/17, 118; 60/328, 705, 39.28 R, 39.28 P

[56] References Cited

U.S. PATENT DOCUMENTS

| | | | |
|---|---|---|---|
| 3,592,053 | 7/1971 | Lucia | 73/116 |
| 3,731,070 | 5/1973 | Urban | 235/151.3 |
| 3,808,882 | 5/1974 | Nick et al. | 73/117.3 |
| 3,950,985 | 4/1976 | Buchwald et al. | 73/116 |
| 3,960,012 | 6/1976 | Ingram | 73/136 A |

*Primary Examiner*—Joseph F. Ruggiero
*Attorney, Agent, or Firm*—Herbert L. Lerner

[57] ABSTRACT

Device for monitoring the service life of the shaft of a turbine-generator set includes an analog computer circuit having a pair of inputs and an output, means for feeding to the inputs of the analog computer circuit electrical quantities proportional to the voltage and the current of the generator, the analog computer circuit having means for converting the electrical quantities that are proportional to the generator voltage and current to an electrical quantity proportional to the electrical torque in the air gap of the generator, a simulation circuit having an input connected to the output of the analog computer circuit for receiving therefrom the electrical quantity proportional to the electrical torque in the air gap of the generator, the simulation circuit comprising means for determining the torques in individual sections of the shaft of the turbine-generator set and having a multiplicity of outputs corresponding to the number of individual sections of the shaft, an analog-to-digital converter having an output and having inputs connected to the outputs of the simulation circuit for receiving therefrom analog data corresponding to the torques in individual sections of the shaft and converting them to corresponding digital data, a digital computer having an input connected to the output of the analog-to-digital converter and connected therethrough to the simulation circuit, a trouble-monitoring device connected parallel to the analog-to-digital converter, and having means for restricting the analog-to-digital converter to feed the digital data through the output thereof to the input of the digital computer only if a torque of extreme value is present in a section of the shaft, the digital computer having means for converting the digital data into signals proportional to the service life of the shaft.

4 Claims, 10 Drawing Figures

DURABILITY OR SERVICE-LIFE MONITORING DEVICE FOR A TURBOGENERATOR SHAFT

Besides being dependent upon operating time, the durability or service life of a highly stressed machine part depends rather considerably on overloads in cases of trouble. It is therefore desirable to recognize sufficiently early in machines or machine parts when damage due to such an overload is to be expected.

The invention of the instant application relates to such a device for monitoring the durability or service life of a machine part by determining the operating parameter relevant for the load or stress, that operating parameter being converted in a nonlinear function generator into signals proportional to the service life, these signals being then added or summed to determine the remaining service life, and then stored.

Such a device for monitoring a gas turbine engine has become known heretofore from German Published Prosecuted Application DT-AS No. 1,499,544. Depending upon the jet pipe temperature of a gas turbine, pulses are obtained with this heretofore known device, through electrical evaluation circuits from time and temperature, the pulses being proportional to the spent or consumed service life. These pulses are stored, for example, in a counter, from which one can read when an overhaul of the power plant is necessary.

Examinations of large turbine-generator sets (over 500 MVA) have shown that not only disturbances in the turbine or in the generator, but also disturbances in the high-voltage network connected therewith can mean considerable stresses for the turbogenerator shaft. In such large plants, a short circuit in the high-voltage network near the tubine-generator or turboset causes the turbongenerator shaft to execute lightly damped torsional vibrations. If the network protection system disconnects the short circuit in the high-voltage network, then the vector of the voltage induced in the generator no longer coincides with the voltage vector in the network. This results in an additional eletrical torque, which is superimposed on the torque from the previous vibrating state of the shaft. In the course thereof, torques can occur which reduce the service life of the turbogenerator very considerably. To prevent damage to the entire turboset, it may therefore be necessary under some conditions to repair parts of the turbogenerator shaft.

The heretofore known device does not take into consideration the hereinaforementioned parameters that can shorten the useful service life of a turbogenerator shaft. It can therefore provide no indication as to when an inspection or precautionary repair of such a shaft will become necessary.

It is accordingly an object of the invention of the instant application to provide a service-life monitoring device for the turbogenerator shaft of a turboset in an electric power station wherein the correct time for making an inspection or for effecting other maintenance-related measures is determinable.

It is a further object of the invention to provide such a device having a combination of sensing and computing circuits, by means of which mechanical stresses acting upon the shaft, and the cumulative effect thereof, can be determined and brought into relation with an empirically determined service-life characteristic curve, and by means of which the percentage of the total expected service life can be indicated that has been spent due to these stresses can be indicated at any given time.

It is another object of the invention to provide such a device having electrical circuits, by means of which the electrical torque in the air gap of the generator, as well as the torques occurring in the individual sections of the turbogenerator shaft can be determined from the measurement of electrical quantities.

It is an additional object of the invention to provide such a device with a circuit, by means of which only those torque indications are admitted for the computation of the cumulative stress that signify a torque exceeding the stress of the shaft permissible in continuous operation.

With the foregoing and other objects in view, there is provided, in accordance with the invention, a device for monitoring the service life of the shaft of a turbine-generator set . . . comprising an analog computer circuit having a pair of inputs and an output, means for feeding to the inputs of the analog computer circuit electrical quantities proportional to the voltage and the current of the generator, the analog computer circuit having means for converting the electrical quantities that are proportional to the generator voltage and current to an electrical quantity proportional to the electrical torque in the air gap of the generator, a simulation circuit having an input connected to the output of the analog computer circuit for receiving therefrom the electrical quantity proportional to the electrical torque in the air gap of the generator, the simulation circuit comprising means for determining the torques in individual sections of the shaft of the turbine-generator set and having a multiplicity of outputs corresponding to the number of individual sections of the shaft, an analog-to-digital converter having an output and having inputs connected to the outputs of the simulation circuit for receiving therefrom analog data corresponding to the torques in individual sections of the shaft and converting them to corresponding digital data, a digital computer having an input connected to the output of the analog-to-digital converter and connected therethrough to the simulation circuit, and a trouble-monitoring device connected parallel to the analog-to-digital converter, and having means for restricting the analog-to-digital converter to feed the digital data through the output thereof to the input of the digital computer only if a torque of extreme value is present in a section of the shaft, the digital computer having means for converting the digital data into signals proportional to the services life of the shaft.

In accordance with another feature of the invention, the analog computer circuit is formed of three subcircuits respectively including first adding means having an input for receiving the terminal voltage of the generator of one phase and the voltage drop in ohmic resistance of the stator of the generator, the first adding means having an output, integrating means having an input connected to the output of the first adding means for integrating the sum of the terminal voltage and the voltage drop, the integrating means having an output, and a series connection of further adders connected to the output of the integrating means, each of the further adders having a respective input for receiving the voltage drop in respective inductive reactances of the stator winding of the generator, multiplying means having inputs and outputs, a summing amplifier having inputs connected to the outputs of the multiplying means, means for vectorially adding and transforming into coordinates of an orthogonal coordinate system the currents and the output of the three subcircuits, as well as measured data proportional to the current, and feeding the resulting data through the multiplying means to the summing amplifier for forming the electrical torque in the air gap of the generator.

In accordance with a further feature of the invention, the simulation circuit includes for each of the shaft sections, an adder for the torques acting upon the individual rotating mass of the respective shaft section, the adder having an output, a first integrator post-connected to the adder and having an input connected to the output of the adder, and having an output, a damping member connected to the output and the input of the first integrator in a feedback circuit, a second integrator having an input connected to the output of the first integrator for forming the angular position of the respective rotating mass, and having an output, and means for connecting the outputs of the second integrators to the respective adders through a respective difference member and a respective multiplier for forming a product of the spring constant of the respective shaft section and the difference angle of the rotating masses of adjacent shaft sections.

In accordance with a concomitant feature of the invention, the trouble-monitoring device comprises respective series circuits, each including a differentiating member and a limit indicator responsive at zero value, each of the series circuits being connected to a respective output of the simulation circuit and to the analog-to-digital converter for controlling the output of the analog-to-digital converter to the input of the digital computer so that only extreme volues of the respective torques in individual sections of the shaft are accepted by the digital computer.

Other features which are considered as characteristic for the invention are set forth in the appended claims.

Although the invention is illustrated and described herein as embodied in a durability or service-life monitoring device for a turbogenerator shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a block diagram of the durability-monitoring device according to the invention;

FIG. 2*a* is a simplified equivalent circuit diagram of the stator winding of the generator of FIG. 1;

Figure 1:
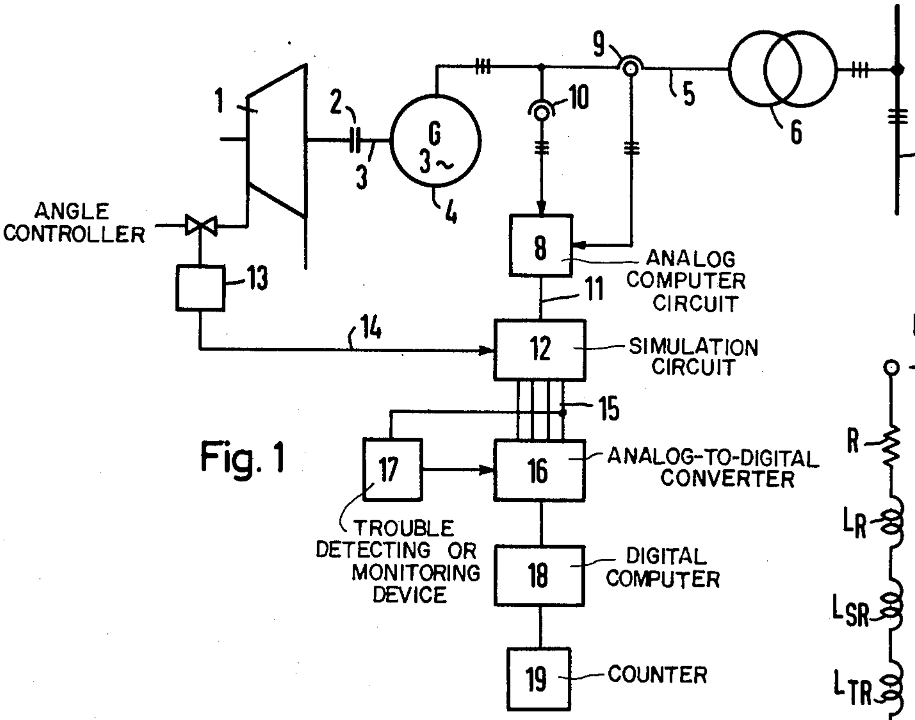
Figure 8:
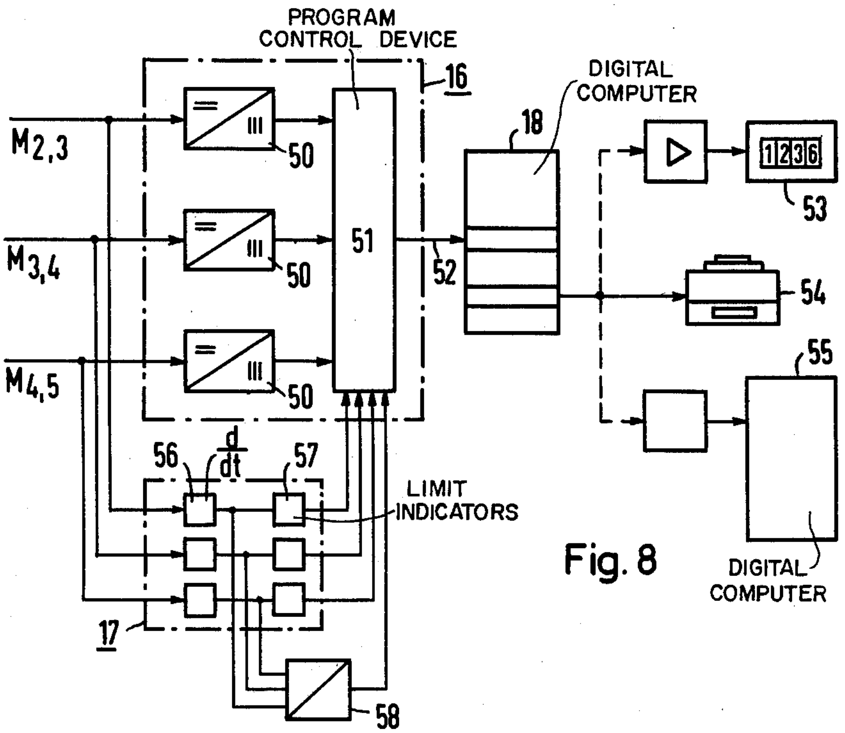
Figure 9:
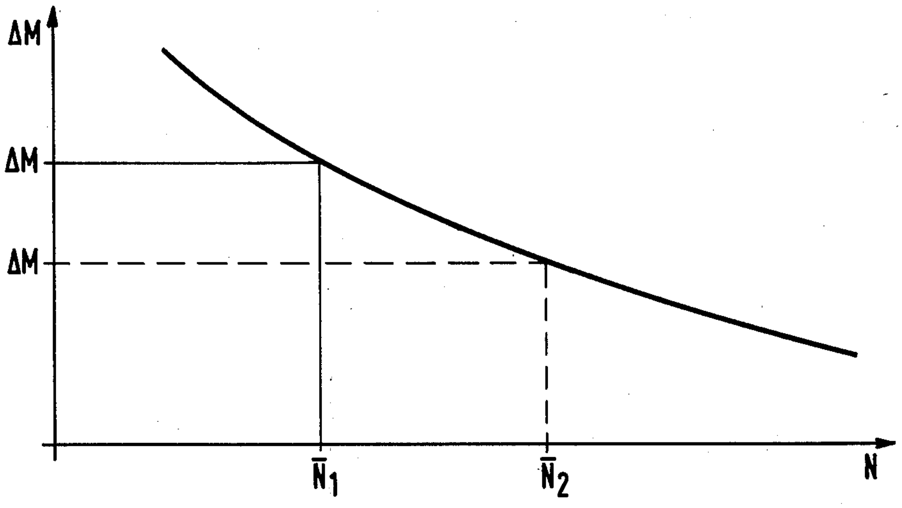

FIG. 8 is a circuit diagram for the analog-to-digital conveyer 16, the trouble-determining device 17, and the digital computer 18 of FIG. 1; and FIG. 9 is a plot diagram of permissable load changes for a given torque.

Referring now to the drawing and first, particularly to FIG. 1 thereof, there is shown a turbine connected to a generator 4 by means of a coupling 2 and a turbine-generator shaft 3. The generator 4 has electric terminals connected by means of a three-phase line 5 to a high-voltage transformer 6, the high-voltage winding of which is connected to an electrical supply system or network 7. An analog computer circuit 8 is connected to the three-phase line 5 by means of current transformers 9 and voltage transformers 10. As is described hereinafter in detail, an electrical analog quantity (current or voltage), which is proportional to the instantaneous value of the torque in the air gap of the generator 4 and hereinafter referred to as "value," is obtained in the output line 11 of the analog computer circuit 8.

The output line 11 is connected to a simulation circuit 12, also of analog construction. In this simulation circuit 12, the turbogenerator shaft is simulated as a torsional vibration system wherein the individual turbine sections, the generator rotor and the exciter are conceived of as rotating or flywheel masses and the shaft sections therebetween as torsion springs. As an additional variable, a further measured "value" from an angle controller 13 is fed to the simulation circuit 12 through a measured-"value" line 14. The simulation circuit 12 establishes a "value" proportional to the torque of the individual turbine section. As is also described hereinafter, electrical quantities which are proportional to the torques in given shaft sections of the turbogenerator shaft, and hereinafter also referred to as "values", are produced in the output lines 15 of the simulation circuit 12.

The output lines 15 are connected to an analog-to-digital converter 16 and led parallel thereto to a trouble-detecting or monitoring device 17 which determines, upon the presence of a disturbance, when a measured torque "value", which is fed to the analog-to-digital converter 16 through the output lines 15, is an extreme "value". If such an extreme "value" is perceived, the trouble detecting or monitoring device 17 causes the analog "value" present to be received and converted. A digital computer 18 behind or post-connected to the analog-to-digital converter 16 accepts or receives this "value", compares it with an empirically derived non-linear curve which indicates the service life or durability of the shaft as a function of the respectively incident maximum torque, and therewith converts the torque "value" fed to it into pulses which are proportional to the spent or used-up service life. These pulses are stored, for example, in a counter 19 post-connected to the digital computer 18. Since the total service life is known, one can read from this counter the percentage of the service life of the turbogenerator shaft that has been spent and when a thorough inspection or reconditioning of the shaft is necessary.

Figure 2A:
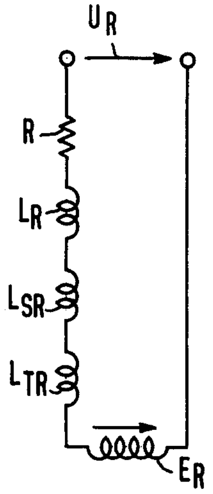
FIG. 2b is a diagram of an analog simulation circuit for FIG. 2*a;*
Figure 2B:
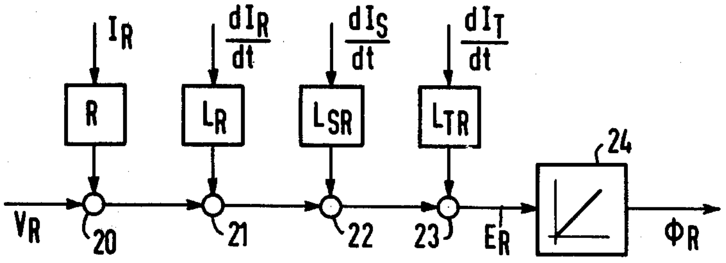

To explain the function of the analog computer circuit 8, a simplified equivalent circuit diagram of the stator winding of the generator is shown in FIG. 2*a* and an analog simulation circuit thereof in FIG. 2*b*, which afford the determination of the flux effective in the air gap for the phase *R* from the terminal voltage of the generator. The circuits for the other two phases *S* and *T* are identical therewith. The voltage $V_R$ in FIG. 2*a* results in a current which flows through the ohmic resistance $R$ of the stator winding as well as through the inductive stray reactance $L_R$ and through the inductively linked stray reactances $L_{SR}$ and $L_{TR}$. A voltage drop is therefore produced at these impedances, which, if added to the terminal voltage $V_R$, yields the voltage $E_R$ effective for the air gap flux in accordance with the equation:

$$E_R = V_R + R\,I_R + L_R\,(dI_R/dt) + L_{SR}\,(dI_S/dt) + L_{TR}\,(dI_T/dt).$$

As is shown in FIG. *2b*, the adders or summers 20 to 23 can be connected in series to solve the equation and thus add up the individual terms of the equation above. The drawing symbols used for these elements, as well as for other electrical control elements shown in FIGS. *2b*, 3, 5, 6, 7 and 8 are generally accepted standard symbols and therefore are believed to require no further explanation. As shown in FIG. *2b*, at the output of the adder 23, the voltage $E_R$, which is effective for the air gap flux, is obtained. This voltage $E_R$ is then fed to the input of an integrator 24, at the output of which a quantity or "value" proportional to the air gap flux $\phi_R$ appears.

Figure 3:
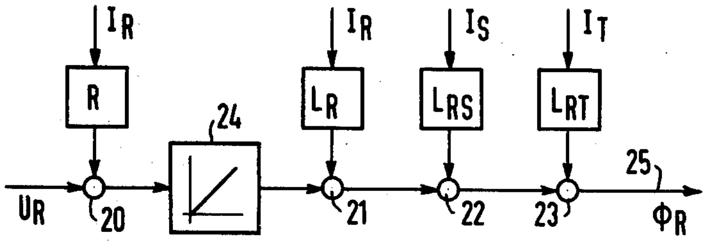
FIG. 3 is an embodiment of the simulation circuit of FIG. 2*b;*
Figure 4:
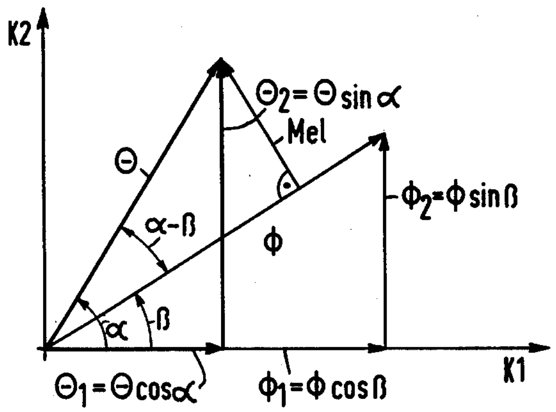
FIG. 4 is a vector diagram showing the output of the coordinate transformers or resolvers of FIG. 5.
Figure 5:
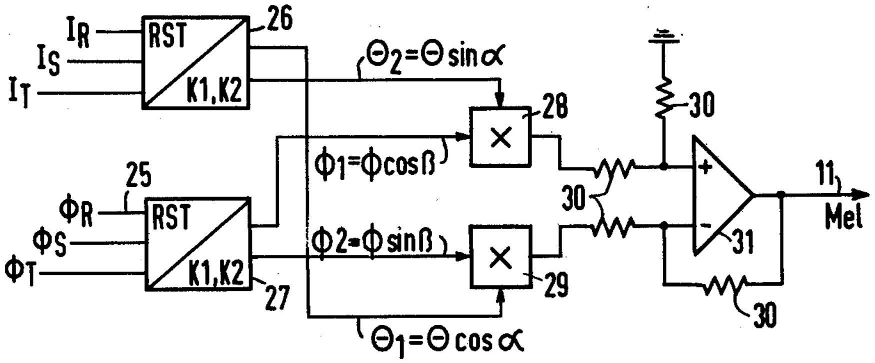
FIG. 5 is a circuit including coordinate transformers or resolvers and forming part of the analog computer circuit of FIG. 1.

An advantageous embodiment of the simulation circuit of FIG. *2b* is shown in FIG. 3, wherein the integrator 24 has already been connected following the first adder 20. Contrary to FIG. *2b*, the phase conductor currents $I_R$, $I_S$, $I_T$ are no longer differentiated prior to being multiplied by the inductive reactances $L_R$, $L_{RS}$ and $L_{RT}$. Since the adders 21 to 23 are post-connected to the integrator 24, an electrical quantity or "value" which is proportional to the air gap flux $\phi_R$ is again obtained on the output line 25. In addition to these circuits, one of which is provided for each phase, a circuit according to FIG. 5 is also contained in the analog computer circuit 8. The input variables for two coordinate transformers or resolvers 26 and 27 are the currents in the three phase conductors R, S and T as well as the electrical quantities or "values" obtained from the circuits according to FIG. 3, which are proportional to the fluxes $\phi_R$, $\phi_S$ and $\phi_T$. In the coordinate resolver or transformers 26 and 27, the vectors of the currents and fluxes, respectively, in the three phase lines R, S and T are vectorially added or summed. As a result, the vector identified by the reference character $\theta$ in FIG. 4 is obtained in the coordinate transformer 26. The addition of the flux vectors results in the vector identified by the reference character $\theta$ in FIG. 4. The coordinate resolver or transformer 26 forms the coordinates of these vectors in the direction of the R-axis (abscissa) and perpendicularly thereto. The coordinate along the R-axis is identified as K1 and the coordinate perpendicular thereto as K2. Accordingly, the components in the direction of the coordinate K1 are provided with the subscript 1 and the components in the direction of the coordinate K2 with the subscript 2. The electrical torque $M_{el}$ produced in the air gap of the generator is then obtained from the vectorial product of the vectors $\theta$ and $\phi$. Thus, the following equation applies:

$$, \vec{M}_{el} = \vec{\phi} \times \vec{\theta} = \phi \cdot \theta \sin(\alpha - \beta)$$

This equation can be transformed into the equation;

$$, \phi \cdot \theta \sin(\alpha - \beta) = \phi \cdot \theta \sin\alpha \cos\beta - \phi \cdot \theta \cos\alpha \sin\beta.$$

In accordance with this equation, the outputs of the coordinate resolvers or transformers 26 and 27 in FIG. 5 are connected to multipliers 28 and 29. The outputs of these multipliers 28 and 29 are fed through a resistance circuit formed of resistances 30, with different signs, to a summing amplifier 31 having an output line 11 at which an electrical quantity or "value" that is proportional to the electrical torque $M_{el}$ accordingly appears.

Figure 7:
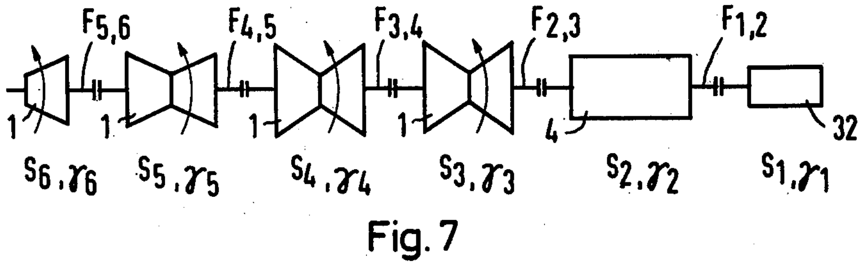
FIG. 7 is a diagrammatic view of a turbine-generator shaft.
Figure 6:
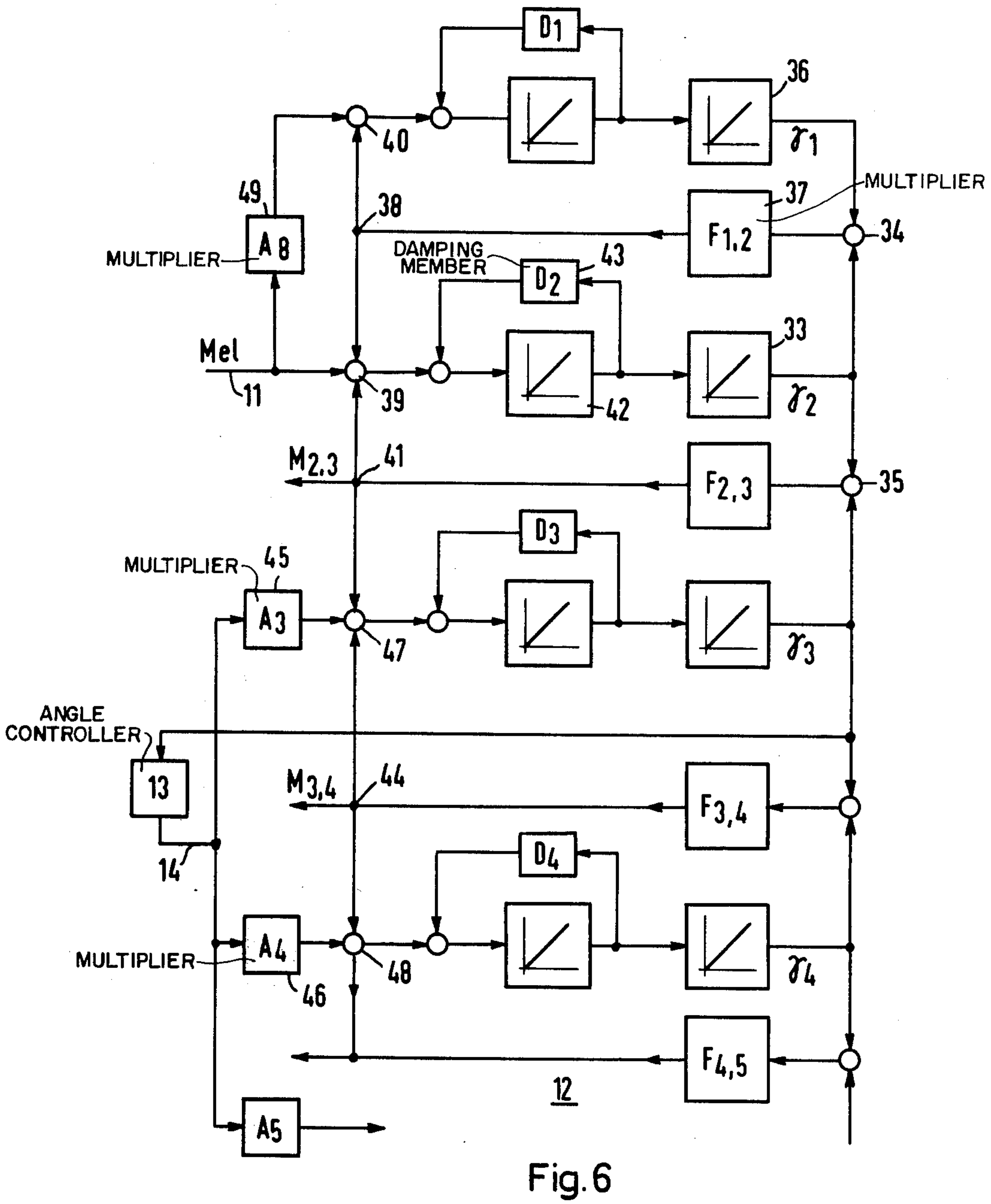
FIG. 6 is a diagram of the simulation circuit 12 of FIG. 1.

In FIG. 6, the simulation circuit 12 is shown, by which the torques in the individual sections of the turbogenerator shaft can be determined. The turbogenerator shaft is shown schematically in FIG. 7. The turbine 1 in FIG. 7 includes a high-pressure turbine section or stage, a medium-pressue turbine section and two low-pressure turbine sections. The rotor of the generator 4 and the rotor of the exciter machine 32 are also connected to the turbogenerator shaft. The turbine and generator rotors are conceived of as rotating masses $S_1$ to $S_6$ have, for example, an angle with respect to the horizontal, the angles, respectively, as, for example, $\gamma_1$ to $\gamma_6$.

In explaining the operation of the simulation circuit shown in FIG. 6, it is assumed that, at the output of an integrator 33, a "value" is present which corresponds to the angle $\gamma_2$ (angular position of the rotor of the generator 4). This angular position is applied to two difference members 34 and 35.

To explain the operation, it is further assumed that the "value" of the angle $\gamma_1$ of the exciter machine 32 is present at the output of the integrator 36. Then, a "value" corresponding to the difference between the "values" of the angles $\gamma_1$ and $\gamma_2$ is formed in the difference member 34. The section of the turbogenerator shaft between the generator 4 and the exciter 32 is twisted by that difference angle. This shaft section between the generator 4 and the exciter 32 has a spring constant denoted by $F_{1,2}$ in FIGS. 7 and 6. In a multiplier 37, the torque is formed from the angle $\gamma_1 - \gamma_2$ and the spring constant $F_{1,2}$ of this shaft section between the generator 4 and the exciter 32. At an output point 38 of the multiplier 37, a measurement "value" or quantity is therefore present, which is proportional to the torque of this shaft section between the generator 4 and the exciter 32.

This measurement "value" or quantity at the output 38 is applied to adders 39 and 40. Among others "values", a "value" corresponding to the electrical torque $M_{el}$ is fed to the adder 39 through the line 11. In addition, the adder 39 receives from the output point 41 a measurement "value" or quantity which is proportional to the torque of the shaft section between the rotating masses $S_2$ and $S_3$. These three torques act on the rotor of the generator 4. The output of the adder 39 is fed to an integrator 42, which integrates the resulting torque over the time, so that at the output of the integrator 42 an electrical measurement "value" or quantity is present which is proportional to the angular velocity of the generator rotor. The output of the integrator 42 is connected to the input of the integrator 33. Thus, a measurement "value" or quantity which is proportional to the integral of the angular velocity of the generator rotor i.e. to the angular position $\gamma_2$ of the generator is produced at the output of the integrator 33. A damping member 43 is connected into a feedback line of the integrator 42. This member 43 is adjusted so that the damping at the integrator 42 caused thereby corresponds to the damping of the corresponding shaft section of the turbogenerator shaft.

In a similar manner, the torques $M_{2,3}$, $M_{3,4}$, etc. are obtained at the respective output points 41, 44, etc. To take into consideration the torques that act upon the individual turbine sections and that are transmitted to the rotors of the turbine by the steam flowing therethrough, the output line 14 of the angle controller 13 is connected through multipliers 45, 46, etc. to respective adders 47, 48 etc. In the multipliers 45, 46, the output "value" of the angle controller 13 is multiplied by constant matching factors $A_1$, $A_2$, etc. These matching factors $A_1$, $A_2$ are obtained from the quantity and the operating pressure of the steam fed to the individual turbine sections. A further multiplier 49 takes into consideration the torque acting upon the exciter machine 32. It is connected between the output line 11 and the adder 40. The matching multipliers are identified by the letter A and a subscript, and the multipliers for the damping members by the letter D and a subscript.

The torques $M_{2,3}$; $M_{3,4}$; $M_{4,5}$; etc. that are thus determined, are fed, as shown in FIG. 8, to analog-to-digital converter stages 50, which are provided within a conventional analog-to-digital converter 16, shown schematically in FIG. 8. On the output side thereof, the analog-to-digital converter stages 50 are connected to a program control device 51 of the analog-to-digital converter 16. The program control device 51 receives signals from the trouble-detecting or monitoring device 17 to accept a torque present at the input of an analog-to-digital converter stage and transmits this torque, which has been accepted and converted into digital form, to the digital computer 18 via an output line 52. This digital computer 18 has stored therein in table form the durability or service-life characteristic curve according to FIG. 9 and, when accepting an instantaneous value, delivers pulses, that are converted in accordance with the characteristic curve of FIG. 9 and are proportional to the consumed portion of the service life, to an electromechanical counter 53, a page printer 54 or a further digital computer 55, respectively post-connected thereto.

FIG. 9 shows, in a plot diagram, the permissible load variations N for a given torque $\Delta M$. $\Delta M$ denotes a torque which exceeds the torque that the shaft can withstand continuously. The smaller the permissible number of load changes for an incident torque according to the characteristic curve of FIG. 9, the more pulses the digital computer 18 delivers to the equipment post-connected thereto.

The trouble-detecting or monitoring device 17 is connected in parallel with the analog-to-digital converter 16. The input variables, which represent the torques in the individual shaft sections, are connected via differentiating members 56 and limit indicators 57 behind the latter to the program control device 51. The limit indicators 57 are of such construction as to deliver a pulse if the output signal of the differentiating member 56 respectively connected in series therewith goes toward zero i.e. an extreme value is present. The outputs of the differentiating members 56 are furthermore connected to a memory 58 which is always set for a definite time when the output variable at a differentiating member 56 exceeds a predetermined "value" or amount. The output of the memory 58 is also fed to the program control device 51. The program control device 51 is set up in a manner that an occurring extreme "value" is used for storing an instantaneous torque "value" in the digital computer 18 only if an output pulse is present at the memory 58. This ensures that only those amplitudes of torques occurring in the shaft sections which attain an appreciable magnitude are fed to the digital computer 18. Only in this manner is it possible to manage with the limited storage space available in a digital computer. This is a particular advantage of the invention of the instant application.

There are claimed:

1. Device for monitoring the service life of the shaft of a turbine-generator set comprising an analog computer circuit having a pair of inputs and an output, means for feeding to the inputs of said analog computer circuit electrical quantities proportional to the voltage and the current of the generator, said analog computer circuit having means for converting said electrical quantities that are proportional to said generator voltage and current to an electrical quantity proportional to the electrical torque in the air gap of the generator, a simulation circuit having an input connected to said output of said analog computer circuit for receiving therefrom said electrical quantity proportional to the electrical torque in the air gap of the generator, said simulation circuit comprising means for determining the torques in individual sections of the shaft of the turbine-generator set and having a multiplicity of outputs corresponding to the number of individual sections of the shaft, an analog-to-digital converter having an output and having inputs connected to said outputs of said simulation circuit for receiving therefrom analog data corresponding to the torques in individual sections of the shaft and converting them to corresponding digital data, a digital computer having an input connected to said output of said analog-to-digital converter and connected therethrough to said simulation circuit, a trouble-monitoring device connected parallel to said analog-to-digital converter, and having means for restricting said analog-to-digital converter to feed said digital data through said output thereof to said input of said digital computer only if a torque of extreme value is present in a section of the shaft, said digital computer having means for converting said digital data into signals proportional to the service life of the shaft.

2. Device according to claim 1 wherein said analog computer circuit is formed of three subcircuits respectively including first adding means having an input for receiving the terminal voltage of the generator of one phase and the voltage drop in ohmic resistance of the stator of the generator, said first adding means having an output, integrating means having an input connected to the output of said first adding means for integrating the sum of said terminal voltage and said voltage drop, said integrating means having an output, and a series connection of further adders connected to said output of said integrating means, each of said further adders having a respective input for receiving the voltage drop in respective inductive reactances of the stator winding of the generator, multiplying means having inputs and outputs, a summing amplifier having inputs connected to said outputs of said multiplying means, means for vectorially adding and transforming into coordinates of an orthogonal coordinate system the currents and the output of said three subcircuits as well as measured data proportional to the current and feeding the resulting data through said multiplying means to said summing amplifier for forming the electrical torque in the air gap of the generator.

3. Device according to claim 1 wherein said simulation circuit includes for each of the shaft sections, an adder for the torques acting upon the individual rotating mass of the respective shaft section, said adder having an output, a first integrator postconnected to said adder and having an input connected to said output of said adder, and having an output, a damping member connected to said output and said input of said first integrator in a feedback circuit, a second integrator having an input connected to said output of said first integrator for forming the angular position of the respective rotating mass, and having an output, and means for connecting the outputs of the second integrators to the respective adders through a respective difference member and a respective multiplier for forming a product of the spring constant of the respective shaft section and the difference angle of the rotating masses of adjacent shaft sections.

4. Device according to claim 1 wherein said trouble-monitoring device comprises respective series circuits, each including a differentiating member and a limit indicator responsive at zero value, each of said series circuits being connected to a respective output of said simulation circuit and to said analog-to-digital converter for controlling the output of said analog-to-digital converter to the input of said digital computer so that only extreme values of the respective torques in individual sections of the shaft are accepted by said digital computer.

* * * * *